(12) United States Patent
Seymour

(10) Patent No.: US 6,529,713 B1
(45) Date of Patent: Mar. 4, 2003

(54) HANDSET

(75) Inventor: Richard William Seymour, Surrey (GB)

(73) Assignee: Nokia Mobile Phones Limited, Espoo (FI)

( * ) Notice: Subject to any disclaimer, the term of this patent is extended or adjusted under 35 U.S.C. 154(b) by 726 days.

(21) Appl. No.: 08/922,929

(22) Filed: Sep. 3, 1997

(30) Foreign Application Priority Data

Sep. 12, 1996 (GB) ............................................. 96190301

(51) Int. Cl.$^7$ ............................. H04B 1/38; H04M 1/00; G04B 47/02
(52) U.S. Cl. ...................... 455/90; 455/550; 379/433.1; 368/13
(58) Field of Search ........................... 368/10, 13, 282, 368/278; 455/90, 575, 351; 379/430, 433, 433.1; D14/140, 192, 253, 265

(56) References Cited

U.S. PATENT DOCUMENTS

| | | | | |
|---|---|---|---|---|
| D102,811 S | * | 1/1937 | Anderson | D14/192 |
| 4,847,818 A | * | 7/1989 | Olsen | 368/10 |
| 5,008,864 A | * | 4/1991 | Yoshitake | 368/10 |
| 5,099,519 A | | 3/1992 | Guan | 381/183 |
| 5,170,494 A | | 12/1992 | Levanto | 455/90 |
| 5,200,997 A | | 4/1993 | Leman | 379/428 |
| 5,214,309 A | | 5/1993 | Saarnimo | 257/712 |
| 5,218,577 A | * | 6/1993 | Seager | 368/10 |
| 5,229,701 A | | 7/1993 | Leman et al. | 320/2 |
| 5,235,561 A | * | 8/1993 | Seager | 368/10 |
| 5,239,521 A | * | 8/1993 | Blonder | 368/10 |
| 5,251,189 A | * | 10/1993 | Thorp | 368/10 |
| 5,253,146 A | | 10/1993 | Halttunen et al. | 361/784 |
| 5,260,915 A | * | 11/1993 | Houlihan | 368/10 |
| 5,265,158 A | | 11/1993 | Tattari | 379/433 |
| 5,271,056 A | | 12/1993 | Pesola et al. | 379/58 |
| 5,274,613 A | * | 12/1993 | Seager | 368/282 |
| 5,381,387 A | * | 1/1995 | Blonder et al. | 368/10 |
| 5,440,629 A | * | 8/1995 | Gray | 379/433.12 |
| 5,499,292 A | * | 3/1996 | Blonder et al. | 368/13 |
| 5,564,082 A | * | 10/1996 | Blonder et al. | 455/90 |
| 5,603,103 A | | 2/1997 | Halttunen et al. | 455/90 |
| 5,642,402 A | | 6/1997 | Vilmi et al. | 379/58 |

* cited by examiner

Primary Examiner—Charles N. Appiah
(74) Attorney, Agent, or Firm—Perman & Green, LLP

(57) ABSTRACT

A radio handset assembly comprising: a wearable element; and a radio handset demountable from the wearable element and comprising a flexible portion which is deformable between a curved configuration and a straighter configuration for extending between the ear and mouth of a user.

23 Claims, 3 Drawing Sheets

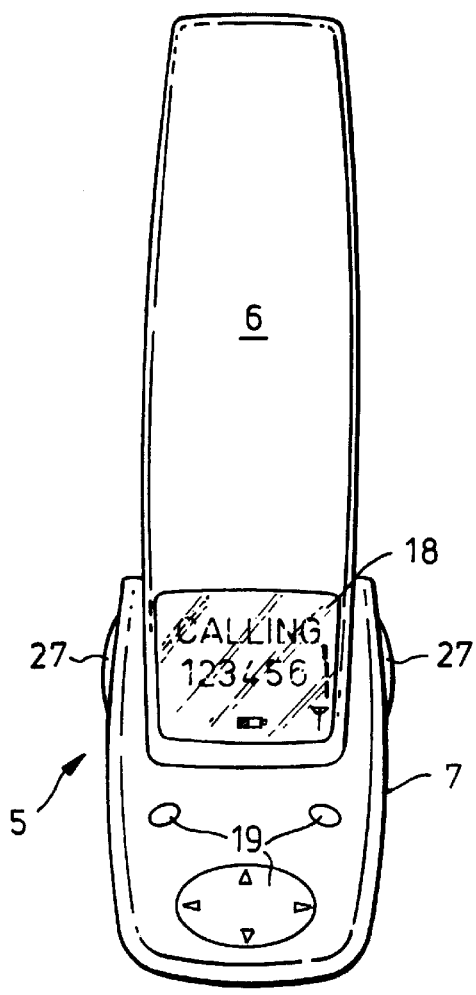
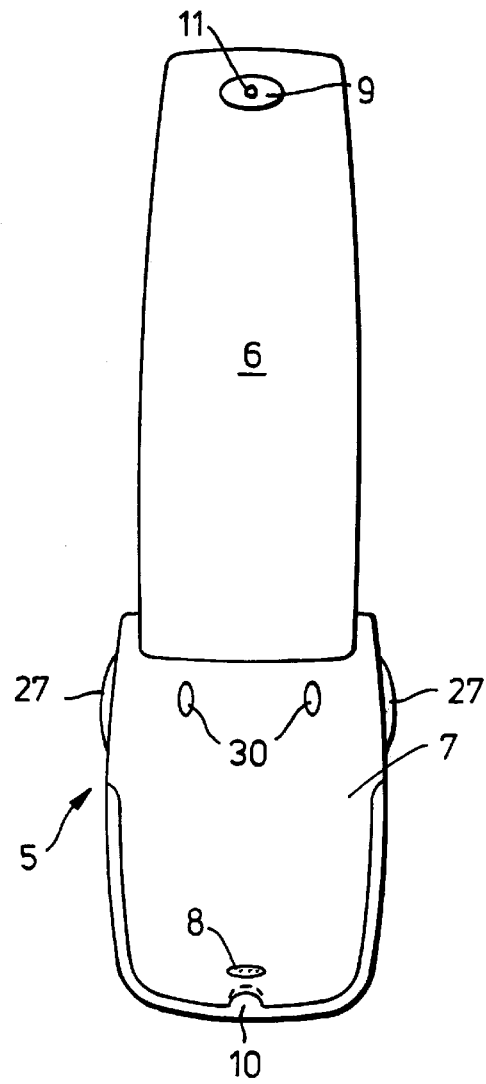
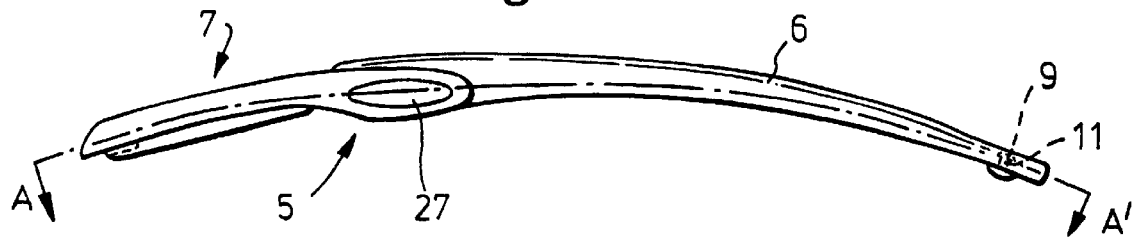

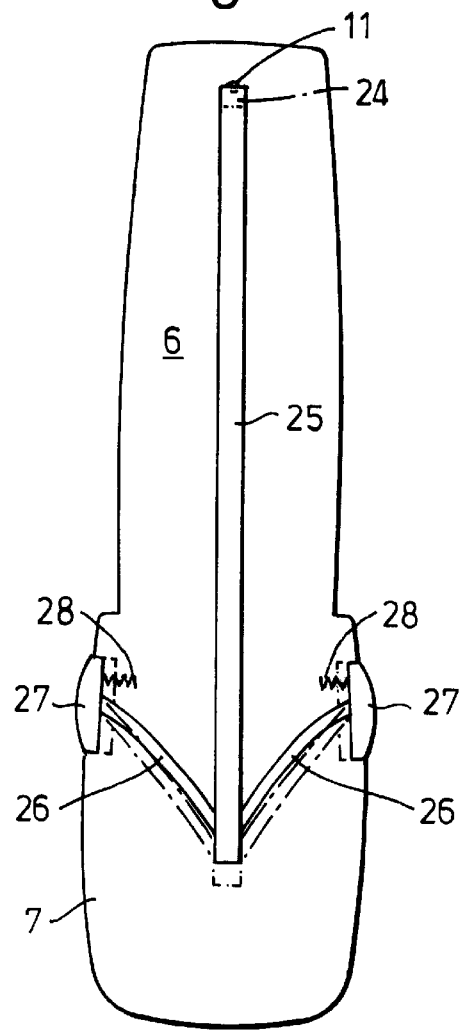
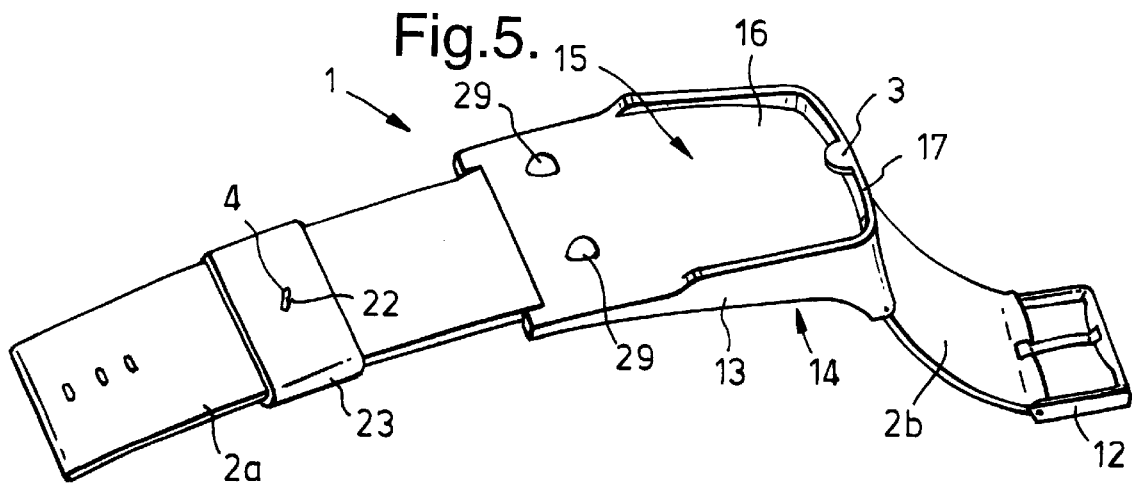

HANDSET

BACKGROUND OF THE INVENTION

This invention relates to a handset and a handset assembly. The term "handset" is used in this document to include units that are capable of communication and are for (in use) being held to the ear and mouth of a user.

A convenient way of carrying a small mobile phone handset is on the wrist, in a similar way to a conventional wrist watch. However, this presents ergonomic difficulties because a phone that is wrapped around the wrist cannot be held near both the ear and the mouth of a user.

SUMMARY OF THE INVENTION

According to one aspect of the present invention there is provided a radio handset assembly comprising: a wearable element; and a radio handset demountable from the wearable element and comprising a flexible portion which is deformable between a curved configuration and a straighter configuration for extending between the ear and mouth of a user.

The radio handset is suitably mountable to the wearable element. The radio handset assembly suitably comprises attachment means for attaching the radio handset to the wearable element. Preferably, there is a releasable coupling for releasably attaching the flexible portion to the wearable element. Preferably there is a release actuator operably linked to the coupling for allowing a user to release the coupling. The coupling is preferably located at or near one end of the flexible portion. The release actuator is preferably located remote from the coupling, most preferably at or near the other end of the flexible portion.

There is preferably means for holding the radio handset in the curved configuration. This means could be provided by a mechanism in the handset itself or, preferably, by the means by which the handset can be fastened to the wearable element (which could hold the handset in a configuration curved to match the curvature of the wearable element from time to time).

The entire radio handset may be flexible. The radio handset preferably comprises a rigid portion from which the flexible portion extends. The rigid portion may contain and/or protect processing means of the handset. The rigid portion may include display(s) and/or key(s). The rigid portion preferably has a concave surface for abutment against a complementary surface of the wearable element when the handset is mated with the wearable element. The flexible portion preferably encloses at least part of an antenna of the radio handset.

The flexible portion is preferably biased into the straighter configuration. The flexible portion is preferably resiliently deformable between the curved configuration and the straighter configuration. Alternatively (or in addition) there may suitably be means for causing and/or allow deformation of the flexible portion from the curved configuration to the straighter configuration. The coupling(s) are suitably capable of holding the flexible portion in its curved configuration when the handset is mounted to the wearable element; then, means for releasing the coupling may cause (and/or allow) the flexible portion to adopt its straighter configuration. The handset is preferably mountable to the wearable element with the flexible portion (which is preferably elongate) aligned with the strap of the wearable element.

The wearable element suitably comprises a strap for engaging a limb of a user. This is most preferably a wrist strap for engaging and wrapping around a user's wrist. The handset is preferably mountable to the wearable element with the flexible portion (which is preferably elongate) aligned with the strap of the wearable element. In its curved configuration, the flexible portion is suitably capable of curving around (preferably part-way around) a user's wrist when the wearable element is attached to the user's wrist. In the straighter configuration the radio handset is preferably curved to conform to a user's face, most preferably the user's cheek. The radio handset is preferably dimensioned so that in use it extends only part way between the ear and mouth of the user. In the curved configuration the handset preferably fits around the limb of a user, most preferably the user's wrist.

An acoustic transducer is suitably provided on the flexible portion. Preferably, two acoustic transducers are provided on the radio handset. One or both of the transducers is preferably located at or near (for example within 5 mm or 10 mm or 15 mm or 20 mm or 25mm of) an end of the handset or the flexible portion of the handset. When two acoustic transducers are provided they are preferably at or near opposite ends of the radio handset.

Processing means for processing digital or analogue electrical signals is preferably provided in the flexible portion.

According to a second aspect of the invention there is provided a radio handset comprising a flexible portion which is deformable between a curved configuration and a straighter configuration for extending between the ear and mouth of a user. The handpiece may have other features as described above.

The features of the radio handset could be applied to a mobile phone handset or, in general, a communication handset.

According to a third aspect of the invention there is provided a wearable element comprising: a strap for engaging a limb of a user; and coupling means for coupling the wearable element to a radio handset. The wearable element may have other features as described above.

BRIEF DESCRIPTION OF THE DRAWINGS

The present invention will now be described, by way of example only, with reference to the accompanying drawings in which:

FIG. 1 is a front view of a radio handset;

FIG. 2 is a rear view of the radio handset of FIG. 1;

FIG. 3 is a side view of the handset of FIG. 1;

FIG. 4 is a schematic cross-sectional view on the line A–A' of the handset of FIG. 1 ;

FIG. 5 shows a wearable element suitable for use with the handset of FIG. 1;

DETAILED DESCRIPTION OF THE INVENTION

Figure 6:
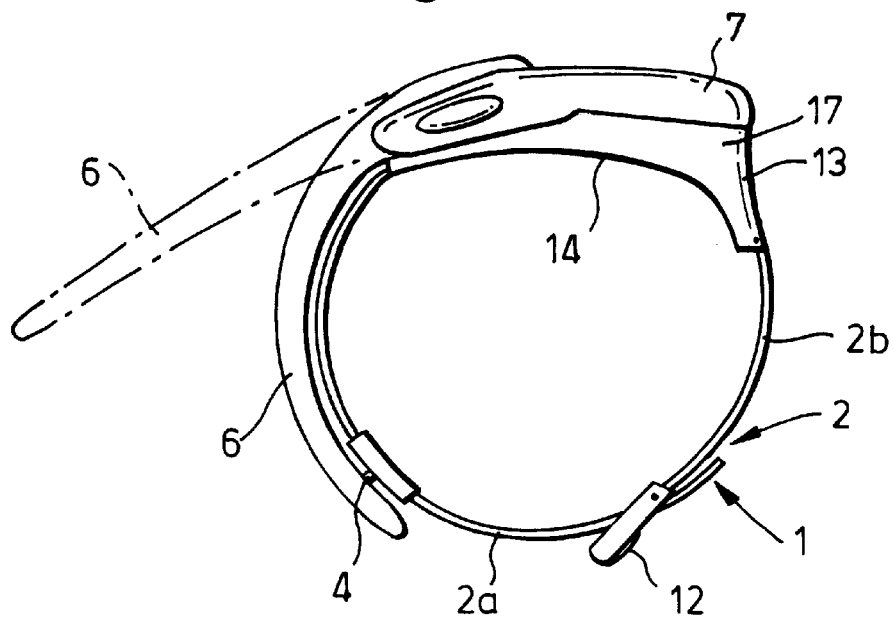
FIG. 6 illustrates from the side the radio handset of FIG. 1 together with the wearable element of FIG. 4 as they would be worn on the wrist of a user.

The figures show various views of components of a radio handset assembly. The radio handset is a radio telephone handset for use in a cellular telephone network. There is a wearable element 1 which has a wrist strap 2, so that it can be worn around a user's wrist, and couplings 3, 4 for allowing a radio handset to be mounted to it. The radio handset 5 comprises a flexible portion 6 and a rigid portion 7. The handset has a microphone 8, a speaker 9 and couplings 10, 11 which mate with the couplings 3, 4 of the wearable element so that the handset can be mounted firmly but releasably to the wearable element. The flexible portion is deformable between a curved configuration (as shown in solid lines in FIG. 6) and a straighter configuration (as shown in chain-dotted lines in FIG. 6). In the curved configuration it can be worn around the user's wrist, attached around the wrist strap of the wearable element. In the straighter configuration (see also FIG. 3) it can be placed against the cheek of a user, extending at least part way between his ear and mouth to allow a telephone call to be made conveniently.

The wearable element 1 has a flexible wrist strap 2, in two parts 2a,2b, which can pass around the wrist of a user and fasten with a buckle 12, like a conventional watch. The two parts of the strap are pivotally connected to a rigid shoe 13. The shoe has a concave underside 14, shaped with a varying curvature to match the curvature of a users wrist and inhibit rotation of the shoe around the wrist when it is being worn. On the upper side of the shoe is a recess 15 of a complementary shape to the rigid portion 7 of the handset. The recess is bounded by a convex upper surface 16 of the shoe and a raised wall 17 which abuts the end of the rigid portion 7 when it is engaged in the recess. Other types of wearable element which could be used are, for example: headbands, neck straps/pendants, belt clips, belts and waist bands.

The radio handset 5 has two main structural parts: the flexible portion 6 and the rigid portion 7 from which the flexible portion extends. The flexible portion is inset into the rigid portion (see FIGS. 1 and 2). On the outer surface of the rigid portion is a user interface comprising a liquid crystal display 18 and keys 19. These communicate with a processor 32 (FIG. 7) within the handset to allow the user to control the handset—for example to make and answer telephone calls and to alter software settings of the handset. The processor could also be voice-controlled by means of the microphone 8. In the rigid portion 7 of the handset is a microphone 8 and at the opposite end of the handset, in the distal end of the flexible portion 6, is a speaker 9. The microphone and speaker face the inner surface of the handset so that they are best usable when a user holds the inner surface of the handset against his cheek, with the microphone relatively near his mouth and the speaker relatively near his ear. In another embodiment the flexible portion 6 could, instead of being resilient, have two or possibly more rigid parts that are hingedly connected together to allow deformation between a relatively curved configuration and a straighter configuration.

Figure 7:
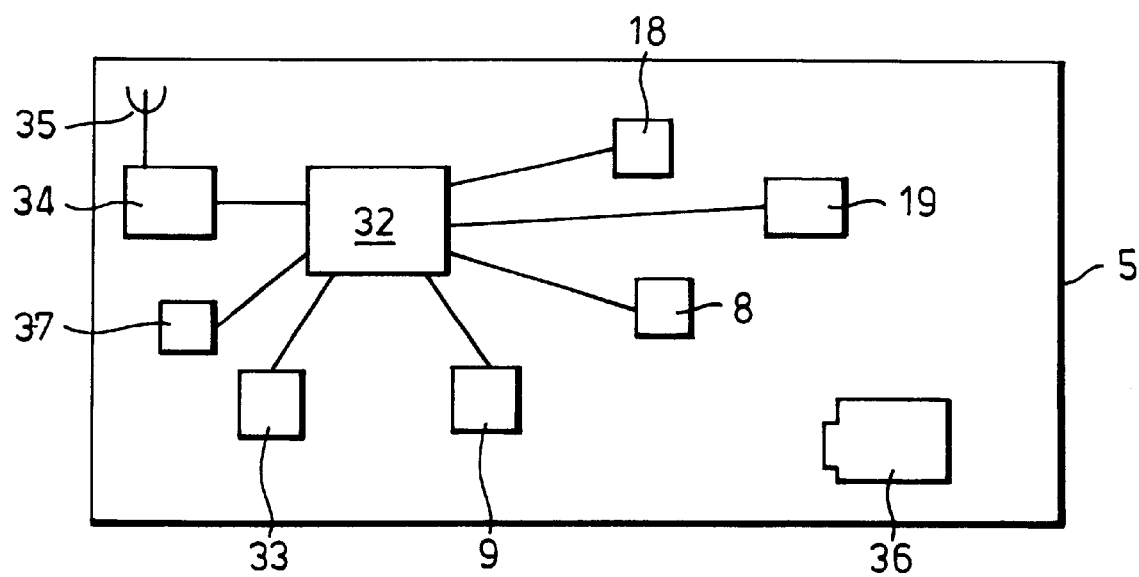
FIG. 7 is a schematic diagram of the electronic components of the radio handset of FIG. 1.

The radio handset is a mobile phone handset which can be used to make and receive telephone calls in a cellular radio telephone network. (It could alternatively be a satellite/mobile phone or a cordless phone). The electronics of the radio handset are similar to those of a radio telephone handset of traditional design. FIG. 7 shows the processor 32 connected to the microphone 8, speaker 9, display 18 and keys 19. A ringer 33 can generate audible ringing tones under the control of the processor. A radio frequency (RF) section 34 links the processor to an antenna 35 to allow radio signals to be transmitted and received in the normal way. The antenna is flexible and is embedded in the flexible portion 6. A rechargeable battery 36 is also provided. In alternative embodiments the components could be distributed between the handset 5 and the wearable portion 1, with communication between the two being by means of direct communication via conductive contacts, inductive communication or a low power local radio link. For example: the shoe 13 could contain a second processor linked to a display and/or keys in the shoe; the antenna 35 (which is for longer range radio communication than any low power link that may be provided) could be within the strap 2; and/or the RF section 34 could be in the shoe 13.

The structural body of the flexible portion of the handset consists principally of a rubber material. The flexible portion is resiliently deformable but its natural shape is as shown in FIG. 1: relatively straight but adopting a slight curve, and in particular with its inner surface being somewhat concave. This concavity is intended to match generally the shape of a user's face when the handset is in use against the user's cheek, with the microphone 8 to the user's mouth and the speaker 9 to the user's ear, to make the handset comfortable to use. The radius of curvature of the inner surface of the flexible portion when it is in its natural configuration is around 500 mm. The flexible portion can be bent, against the natural bias of the rubber, to greater or lesser curvatures. In particular, it can be bent comfortably to a radius of curvature of around 40 mm to 60 mm so as to match the curvature of a user's wrist when it is mounted, in use, against the wearable element as illustrated in solid lines in FIG. 6. However, the bias of the rubber ensures that when it is released from the wearable element the flexible portion is caused to automatically adopt the straighter configuration illustrated in chain-dotted lines in FIG. 6. The handset 5 is relatively small, with the result that in its relatively straight configuration the distance between the microphone 8 and the earpiece 9 is somewhat less than the distance between a typical user's mouth and ear. However, the microphone and the earpiece are capable of providing satisfactory operation some distance from a user's mouth and ear respectively.

The coupling 3 is a tab which extends from the wall 17 into the recess 15 and matches a recess 10 in the rigid portion 7 of the handset. The couplings 3 and 10 co-operate to hold the forward end of the rigid portion in engagement with the shoe when the two are mounted together. The coupling 4 is a pin in which there is a notch 22. The pin is mounted on a collar 23 through which the strap 2a passes. The collar 23 can be slid along the strap 2a. The corresponding coupling 11 is a recess sized to receive the pin 4, with a movable tongue 24 which can engage the notch 22. (For acoustic reasons the speaker 21 is also positioned in the recess 11). The tongue is the distal end of a link 25 (FIG. 4) which is slideable along its own major axis within the flexible portion 6. Arms 26 connect the proximal end of the link to buttons 27 inset into the sides of the rigid portion, so that when the buttons are pressed the link slides towards the proximal end of the handset (shown by chain-dotted lines in FIG. 4). The buttons are biased outwards by springs 28 which also bias the link 25 towards the distal end of the handset, and the tongue into the position in which it juts into the recess 11.

When the handset 5 is to be mounted on the wearable element 1 the rigid portion is inserted in the recess 15. Projections 29, which extend out of the floor 16 of the recess 15, and corresponding slots 30 in the inner surface of the rigid portion 7 help to locate the rigid portion of the handset in the recess 15 with the flexible portion 6 in alignment with the strap 2a. The user then pushes flexible portion 6 towards the strap 2a so as to insert the pin 4 in the recess 11 with the tongue 24 engaged in the notch 22. Depending on the curvature of his wrist the user may need to adjust the position of the collar 23, by sliding it along the strap, so that the pin 4 and the recess 11 are properly aligned. When the handset is to be released from the wearable element the user squeezes the buttons 27 together to withdraw the tongue 24 from the notch 22. The bias of the flexible portion causes it to then spring from the curved configuration to the straighter configuration (see FIG. 6) and the handset can then easily be lifted from the shoe 13.

A user may carry the radio handset mounted on the wearable part. When the radio handset receives an incoming telephone call the ringer 35 generates a ringing tone. The user may then remove the handset from the wearable element and place the handset against his head to make the call. A switch 37 in one of the slots 30, and which can be depressed by the corresponding projection 29, detects whether the rigid portion 7 is engaged with the shoe 13. Using the input from the switch the processor can automatically cause the call to be answered when the handset is removed from the wearable element and ended when it is replaced. Because the keys 19 and the display 18 are on the outer surface of the rigid portion 7 an outgoing call from the handset may be placed whilst the handset is still engaged with the shoe 13. In another embodiment the keys and/or the display (or additional display(s)/key(s)) could be provided on the floor 16 of the shoe so that they are accessible only when the handset has been removed.

In another embodiment, in which there is provision for communication between electronics in the handset 5 and the wearable part 1, as a security feature the processor in the handset may interrogate the wearable part to receive an identification signal from the wearable part. For example, a processor in the wearable part could respond to the interrogation by returning a digital identification code. If no code is received or if the wrong code is received the processor in the handset disables the handset so that at least some calls cannot be made from the handset. The handset may be configured so that its processor interrogates the wearable part regularly—for instance between each call or within a set time interval (e.g. 30 minutes). This is useful if the handset is stolen or lost whilst the user retains the wearable part.

To accommodate the preferences of different users the microphone 8 and the speaker 9 could be provided at the opposite ends of the handset from those described above. Alternatively, transducers (for example suitable piezoelectric transducers) which can act as both a microphone and a speaker could be used. The operation of these transducers could be governed by user settings stored by memory in the handset or could be determined by the processor detecting which one of the transducers detects the greater volume as the user speaks into the handset.

Some dimensions of the handset shown in the figures are as follows:

length: 130 mm, width of rigid portion of handset at widest point: 40 mm, width of flexible portion of handset at widest point: 25 mm, thickness of flexible portion of handset: 25 mm, distance from end of flexible portion to speaker: 9 mm, distance from end of rigid portion to microphone: 12 mm, distance between speaker and microphone when handset is in straighter configuration: 109 mm.

The present invention includes any novel feature or combination of features disclosed herein either explicitly or implicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A radio handset assembly comprising:
a wearable element; and
a radio handset demountable from the wearable element and
comprising a flexible portion which is deformable between a curved configuration and a straighter configuration for extending between the ear and mouth of a user, said radio handset being biased to the straighter configuration.

2. A radio handset assembly as claimed in claim 1, comprising attachment means for releasably attaching the radio handset to the wearable element.

3. A radio handset assembly as claimed in claim 2, wherein the attachment means comprises a releasable coupling located near one end of the flexible portion.

4. A radio handset assembly as claimed in claim 3, comprising user-actuable release means linked to the coupling for causing the coupling to be released.

5. A radio handset assembly as claimed in claim 4, wherein the release means is remote from the coupling.

6. A radio handset assembly as claimed in claim 4, wherein the radio handset comprises the release means.

7. A radio handset assembly as claimed in claim 1, wherein the attachment means is adapted to hold the radio handset in the curved configuration.

8. A radio handset assembly as claimed in claim 1, wherein the radio handset comprises a rigid portion from which the flexible portion extends.

9. A radio handset assembly as claimed in claim 1, comprising means for holding the radio handset in the curved configuration.

10. A radio handset assembly as claimed in claim 1, wherein in the straighter configuration the radio handset is curved to conform to a user's face.

11. A radio handset assembly as claimed in claim 1, wherein the wearable element comprises a strap for engaging a limb of a user.

12. A radio handset assembly as claimed in claim 11, wherein the radio handset is mountable to the wearable element with the flexible portion aligned with the strap.

13. A radio handset assembly as claimed in claim 11, wherein the flexible portion of the radio handset is mountable against the strap.

14. A radio handset assembly as claimed in claim 1, wherein in the curved configuration the radio handset is curved so as to fit around the limb of a user.

15. A radio handset assembly as claimed in claim 1, wherein the flexible portion is resiliently deformable between the curved configuration and the straighter configuration.

16. A radio handset assembly as claimed in claim 1, comprising means for causing deformation of the flexible portion from the curved configuration to the straighter configuration.

17. A radio handset assembly as claimed in claim 1, comprising an antenna located at least partially within the flexible portion.

18. A radio handset assembly as claimed in claim 1, wherein an acoustic transducer is provided on the flexible portion.

19. A radio handset assembly as claimed in claim 18, wherein the acoustic transducer is provided near the end of the flexible portion.

20. A radio handset assembly as claimed in claim 1, wherein two acoustic transducers are provided on the radio handset.

21. A radio handset assembly as claimed in claim 20, wherein the two acoustic transducers are spaced for communication with the ear and mouth respectively of a user.

22. A radio handset assembly as claimed in claim 20, wherein the two acoustic transducers are provided at opposite ends of the radio handset.

23. A radio handset assembly as claimed in claim 1, wherein processing means is provided in the flexible portion.

* * * * *